United States Patent
Hassler et al.

(10) Patent No.: US 6,289,282 B1
(45) Date of Patent: Sep. 11, 2001

(54) METHOD OF DETERMINING THE DISTANCE BETWEEN AND OBJECT AND A DEVICE OF VARYING LOCATION

(75) Inventors: Gregor Hassler, Bad Camberg; Norbert Fleischhauer, Eschborn, both of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/397,370

(22) Filed: Sep. 15, 1999

(30) Foreign Application Priority Data

Sep. 15, 1998 (DE) ................................. 198 42 250

(51) Int. Cl.⁷ .................. G06F 7/00; G05D 1/00
(52) U.S. Cl. .............. 701/301; 701/300; 701/96; 340/345; 340/346; 342/455
(58) Field of Search ..................... 701/301, 300, 701/96; 340/435, 436, 903; 342/455, 70, 71, 118; 180/169

(56) References Cited

U.S. PATENT DOCUMENTS 5,004,997 * 4/1991 Shisgal ......................... 340/436

* cited by examiner

Primary Examiner—William A. Cuchlinski, Jr.
Assistant Examiner—Arthur D. Donnelly
(74) Attorney, Agent, or Firm—Robert J. Depke; Mayer, Brown & Platt

(57) ABSTRACT

A system and method for determining the distance between an object and a device of varying location, in which a first or second sensor arranged on the device emits a signal which is reflected by the object. The reflected signal is received by the sensor transmitting the signal and by the respective other sensor, and an evaluation device determines the propagation times between the transmission of the signal and the reception of the signal for each sensor and determines therefrom all the possible positions of the objects relative to the device of varying location referred to the sensor. The distance from the motor vehicle being determined from the corresponding positions of the measurements. A highly accurate result of the distance measurement is permitted in conjunction with a minimum evaluation time, the evaluation device determines corresponding positions from the measured data in a first, very accurate evaluation method and subsequently determines further corresponding positions on the remaining unverified measured data in a second, less accurate evaluation method.

8 Claims, 4 Drawing Sheets

METHOD OF DETERMINING THE DISTANCE BETWEEN AND OBJECT AND A DEVICE OF VARYING LOCATION

BACKGROUND OF THE INVENTION

1. Field of the Invention

The present invention relates to the field of electronic devices. More specifically, the present invention is directed to a device and method for determining the distance between an object and a device of varying location, such as a motor vehicle.

2. Description of the Related Art

In order to facilitate reversing and to prevent collisions with parked vehicles, or other objects in the way, it is known to provide on the rear of the motor vehicle sensors which, for example, transmit ultrasonic or radar signals and which receive radiation reflected by the obstacle. In this case, the distance between the sensor arranged on the motor vehicle and the obstacle is determined from the propagation time of the signal from the sensor to the obstacle and back again.

DE 40 23 538 A1 discloses a method of generic type in which the distance between an obstacle and a motor vehicle is measured in a contactless fashion. In this case, two ultrasonic sensors are arranged at a prescribed spacing, and a device is provided for evaluating the propagation times between the transmission of in each case one ultrasonic signal and the reception of a reflected ultrasonic signal of respectively the same and the other ultrasonic sensor. The distance is determined in this case using the triangulation principle.

From 197 11 467.9, the measured data obtained from the direct measurement (the sensor transmitting the signal receives the reflected signal) and the measured data obtained by an indirect measurement (a second sensor receives the reflected signal) are compared, and the distance is calculated for the position which was determined by the two measuring methods.

This method has the disadvantage that results of different accuracy are also obtained due to the use of different measuring methods, since measured data which cannot be evaluated are generated with each measuring operation.

It is therefore one object of the present invention to specify a method for determining the perpendicular distance of the object from a motor vehicle, which permits an accurate result of the distance measurement in conjunction with a minimum evaluation time.

Other objects and advantages of the present invention will be apparent from the following summary and detailed description of the preferred embodiments.

SUMMARY OF THE INVENTION

In accordance with the invention distance measurement is achieved by virtue of the fact that in a first, very accurate evaluation method the evaluation device determines corresponding positions from the measured data and, subsequently, in a second, less accurate evaluation method further corresponding positions are determined from the remaining unverified measured data.

The advantage of the invention consists in that very exact measured results are obtained by the measured data generated in a single measuring operation, as a consequence of multiple evaluation. In the process, complicated multiple measurement for the purpose of increasing the accuracy of only one measuring method is eliminated.

In an alternate embodiment, in a first evaluation step the evaluation device determines the positions of the object, determined by at least three propagation time measurements, from the measured data. The distance being determined for the positions of the object which have been measured correspondingly by all three propagation time measurements. Subsequently, in a second evaluation step, the positions of the object determined by at least two propagation time measurements are determined from all the measured data ignored in the first evaluation step and the distance is determined from the position measured by the two propagation time measurements. The distance being determined, from a position determined by a single propagation time measurement, in a third evaluation step from the measured data ignored in the second evaluation step.

This method renders it possible for the measured data obtained to be evaluated not only simply and more accurately, but also more quickly. Such an evaluation method is favorable, in particular, for the near region of the motor vehicle, since because of overlap gaps of the sensor lobes there is less information available here in this region. The selected sequence of the different evaluation methods leads to filtering of the measured data, with the result that each measured value is reliably evaluated only once.

It is advantageous for the evaluation device to monitor the corresponding positions determined in the three evaluation steps with regard to the frequency of their occurrence, and to determine the distance between the object and motor vehicle only for the positions whose frequency exceeds a prescribed limit value. This method step is based on the finding that even different evaluation steps can come to the same result, the evaluation device recording that a position is occupied more than once. This multiple occupation is therefore a statement of the reliability of the evaluation. Moreover, random measured data which occur only once and have been recorded because of dispersion in the environment of the motor vehicle are filtered out.

The distance perpendicular to the vehicle contour is determined from the corresponding positions which have been multiply recorded.

In order to segregate environmental influences, the distance between the object and the device of varying location is determined only when the object is located in a sensor corridor which is defined between the first and the second sensor.

In another embodiment, given the presence of a plurality of sensors, the sensor corridor is defined between the sensors executing the current measurements. This ensures that the direct and indirect measurement is always carried out by two sensors.

Since the sensors have mutually differing distances, sensor corridors of different width are defined in the case of pairwise measurement of the sensors. It is thereby possible for objects or obstacles of different size to be located.

The object with the minimum distance is measured in the case of measurement of a plurality of objects with different distances from the device of varying location, and the minimum perpendicular distance is calculated and stored.

The invention permits numerous embodiments. One of them is to be explained in more detail with the aid of the figures represented in the drawing, in which:

DETAILED DESCRIPTION OF THE PREFERRED EMBODIMENTS

Figure 1:
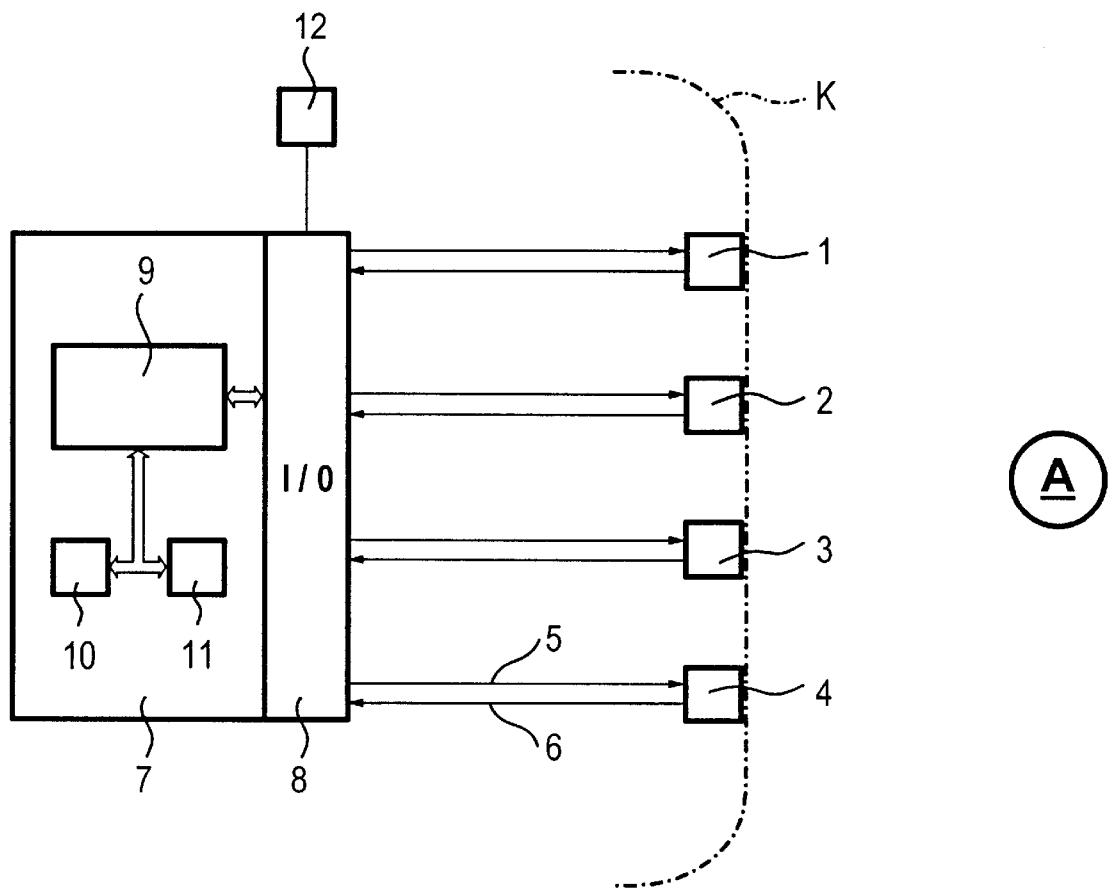
FIG. 1 illustrates an embodiment for determining the distance between an obstacle and a motor vehicle.

In accordance with FIG. 1, four ultrasonic sensors 1, 2, 3, 4 which are used to aid reversing and parking are arranged at uniform distances on the rear bumper of a motor vehicle K.

The piezoelectric ultrasonic sensors 1, 2, 3, 4 serve both as transmitters and as receivers. A control unit 7, which is preferably comprised of a microprocessor, is connected to each of the ultrasonic sensors 1, 2, 3, 4 via transmitting lines 5 and receiving lines 6. The microprocessor in this case has an input and output unit 8, a central processor 9, as well as a main memory 10 and a read-only memory 11.

The microprocessor 7 generates electric pulses with a frequency of approximately 40 KHz which are passed on via the line 5 to the respective ultrasonic sensors 1, 2, 3, 4 and converted there into corresponding ultrasonic pulses. The ultrasonic signals (echoes) reflected by the object A are received by the ultrasonic receivers 1, 2, 3 and 4 and are routed to the control unit 7 as an electric signal via the line 6. The control unit 7 uses its internal clock generator (not represented further) to measure the propagation time between the transmission of the electric pulse and the reception of the electric pulse and stores this in the main memory 10.

The propagation time t of the ultrasonic signal is generally used to determine the distance s between the motor vehicle (sensor) and the obstacle A using the known equation $$s = \tfrac{1}{2} \times v \times t,$$

v representing the speed of sound.

Only a statement concerning the distance between the sensor and object is possible in the case of this direct measurement. A specification of the perpendicular distance between the object A and the motor vehicle K on which the sensor is located fails because of the ambiguity caused by the possible positions of the object. The point is that there are arbitrarily many object positions with the same sensor-object distance. This sensor-object distance can also be regarded as the radius of a circle, and the circle can be regarded as the curve on which one object, but also arbitrarily many objects, can be located. This semicircle is therefore to be denoted as a presence curve DA $1_A$ and DA $1_B$ or DA $2_A$ and DA $2_B$ (see FIG. 3).

Figure 2:
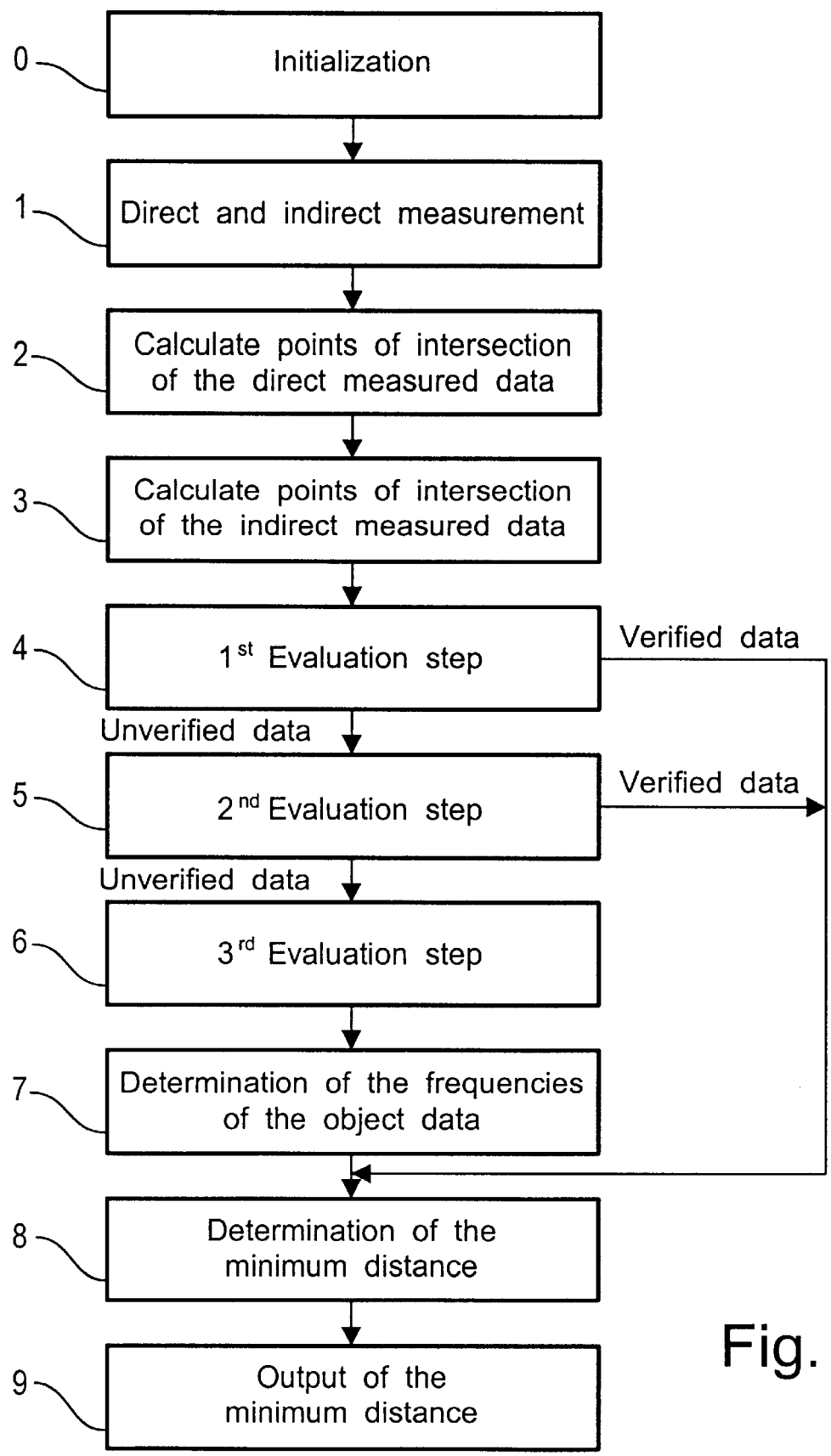
FIG. 2 illustrates a method of operation for the arrangement in accordance with FIG. 1.
Figure 3:
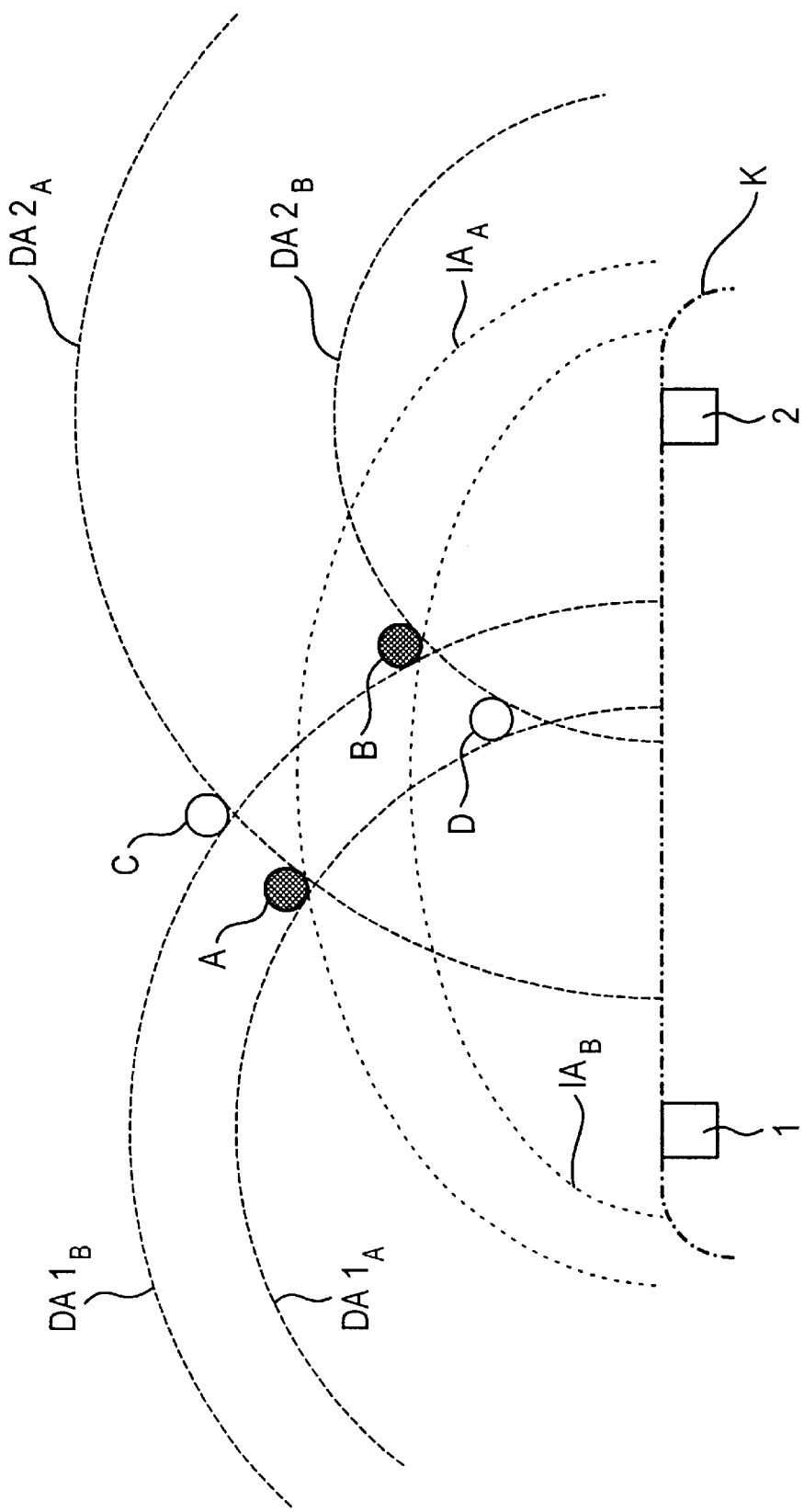
FIG. 3 illustrates direct and indirect measurement by two sensors.

The aim now is to explain the method according to the invention with the aid of FIGS. 2 and 3 for two sensors. Before actual measurement begins, each ultrasonic sensor must have sent at least one signal. This is performed in an initialization phase 0.

In the actual measuring phase 1, the sensors 1, 2, 3, 4 for direct and indirect measurements are driven and sampled cyclically by the control unit 7. This means that sensor 1 emits an ultrasonic signal which is reflected by object A, on the one hand, and by object B, as well. The echoes are received by the sensor 1. As a function of the different propagation times of the signals—from sensor 1 to object A and from sensor 1 to object B and back again—the control unit 7 calculates for each object A and B a distance from the sensor 1 which is stored in the memory 10. All positions of the object A which are possible with this distance are marked by the presence curve DA $1_A$. All possible positions relating to sensor 1 are yielded for object B in accordance with the presence curve DA $1_B$.

The transmission and reception of the signal by one and the same sensor is to be designated below as direct measurement. The same direct measurement is performed by sensor 2. Sensor 2 transmits the signal and receives the reflected signals. For object A, this measurement yields positions relative to sensor 2 which are situated on the direct presence curve DA $2_A$. The positions of object B are situated on the envelope curve DA $2_B$. These curves are stored in the memory 11 of the control unit 7.

Figure 4:
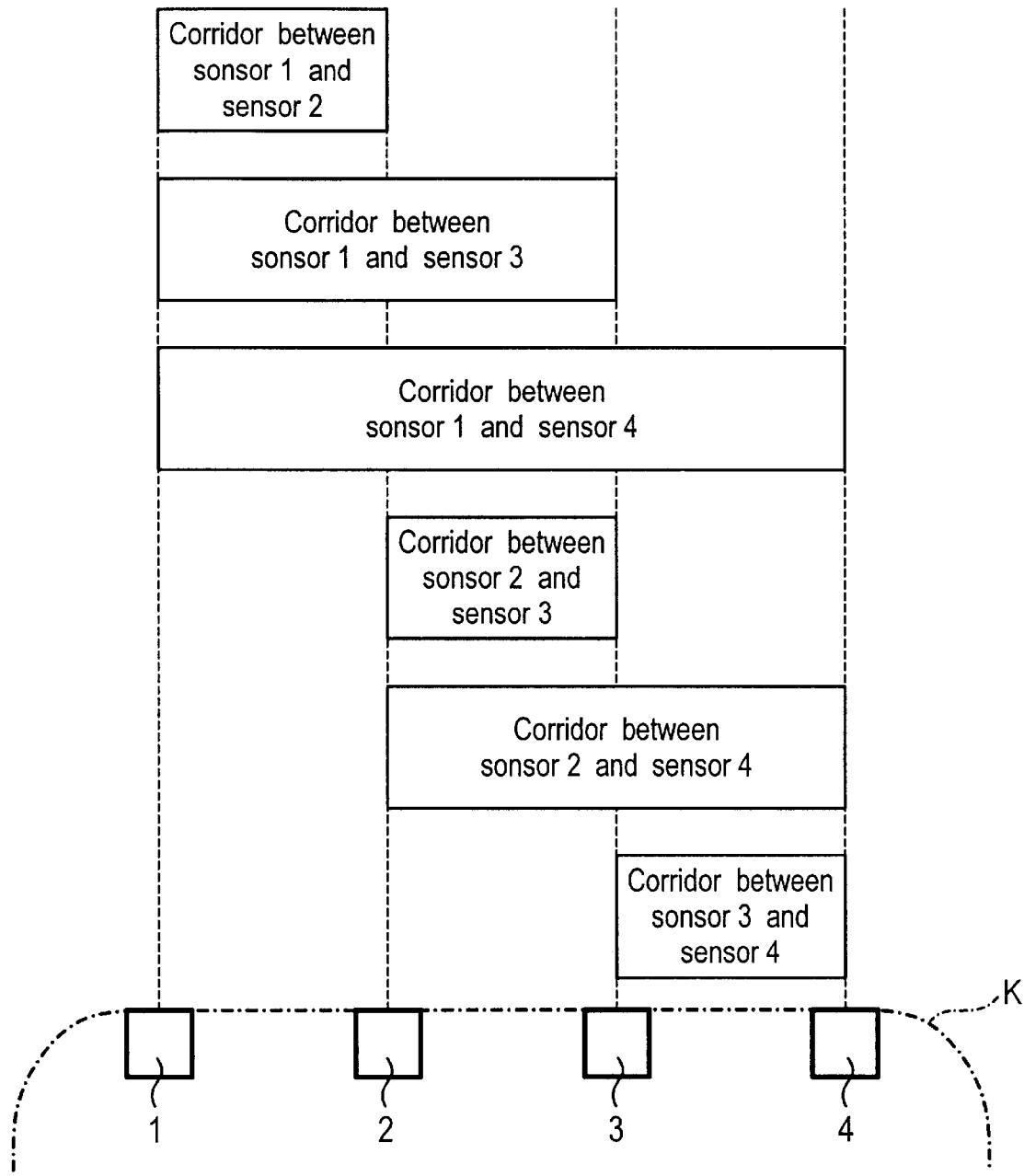
FIG. 4 illustrates sensor corridors.

Indirect measurements are always performed simultaneously with the direct measurement. In the case of indirect measurement, one sensor transmits while a second sensor receives the ultrasonic signal after reflection by an object. This measurement is therefore not a distance measurement, but the path covered by the ultrasonic signal from sensor 1 to the object and further to sensor 2 is determined (FIG. 4). The propagation path is yielded by the equation $$s = v \times t,$$

v also representing here the speed of sound as 343 m/s at 20° C.

For sensor 2, which receives only the reflected signal when the signal is transmitted by the sensor 1, indirect measurement yields the presence curves $IA_A$ and $IA_B$, which are to be explained below.

If all possible positions corresponding to the determined propagation time are plotted, the result is an elliptic presence curve such as is represented in FIG. 3 as $IA_A$ and $IA_B$.

After step 2 in FIG. 2, the presence curves DA $1_A$ and DA $2_A$ or DA $1_B$ and DA $2_B$ determined by direct measurement of the sensors 1 and 2 are compared in order to establish common positions of the objects. This is performed by determining the points of intersection of the presence curves. As may be seen from FIG. 3, however, in addition to the real objects A and B, imaginary objects D and C are also yielded in this case. In step 3, these points of intersection are verified by the curves $IA_A$ and $IA_B$, which are obtained by indirect measurement of the sensors 2 and 1, respectively. Only the points of intersection of the direct measurements, at which real objects are also located, are passed through by the presence curve $IA_A$ or $IA_B$.

The detected objects are stored in a two-dimensional coordinate system in which the x-axis runs parallel to the rear vehicle contour and the y-axis perpendicular thereto characterizes the distance of the object from the vehicle.

All data measured during a measuring operation are evaluated in a first evaluation step 4 which represents the most accurate measuring method.

This measuring method is an evaluation of three propagation times which consist either of two direct measurements and one indirect measurement, or instead, in a fashion equivalent thereto, of two indirect measurements and one direct measurement. All the measured data which lead to a result with the aid of this evaluation method are segregated.

All the measured data which it was impossible to assign in this first evaluation step are fed to a second evaluation step 5. In this evaluation step, the positions which result from two propagation time measurements are compared with one another, and here, as well, there are three possibilities for evaluation which are mutually equivalent. In this case, it is possible to compare the positions from the two direct measurements of the two sensors, or the positions which were generated in a direct measuring method and an indirect measuring method, but it is also possible instead, as a third variant, to compare the positions which were determined in two indirect measurements. The measured data which lead to a reliable result are also filtered out in this method step.

Evaluation step 5 is followed by a third evaluation step 6 which is applied to the measured data which have not led to a plausible result either in the first or in the second method step.

A search is made in the third method step for the measured data which determine the position of the object by means of a simple propagation time measurement as a consequence of a direct measurement or indirect measurement of the position of the object.

Object data are determined in all three evaluation steps 4, 5, 6. In this case, it is possible for the same object data to be determined in different evaluation steps. The evaluation device counts the frequency of the same object date which occur, and determines the distances of the object from the outer contour of the motor vehicle from the object data which exceed a specific limit value.

In step 8, all objects detected as real are used to determine the object with the smallest distance, and the distances calculated. The minimum distance is filtered by means of sliding averaging and output in step 9 to the display device 12 in FIG. 1. This display device is usually a loudspeaker which emits a hooting sound when the motor vehicle approaches an obstacle.

In order to enhance the reliability of the measurement results, it can additionally further be established whether the object A or B thus established is also located in the sensor corridor between the sensors participating in the formation of the point of intersection. This sensor corridor extends perpendicularly over the full width of the distance of the sensors in the direction of the obstacle.

In the case of the four sensors 1, 2, 3, 4, represented in FIG. 4, which are used, the measuring method is always carried out such that the described direct and indirect measurements are always performed in pairs. Since the direct measurement of each sensor is intersected by those of all other sensors, the result is six possible combinations of sensors and thus six possible corridors, which can differ in width.

A highly accurate and reliable determination of the obstacle is possible on the basis of this evaluation method.

We claim:

1. A method for determining the distance between an object and a device of varying location comprising the steps of:
    generating a first signal with a first sensor;
    receiving the first signal reflected from an object with the first sensor and a second sensor;
    generating a second signal with the second sensor;
    receiving the second signal reflected from the object with the first sensor and a second sensor;
    determining propagation times between the transmission of the first signal and the reception of the first signal for each sensor;
    determining at least one propagation time between transmission of the second signal and the reception of the second signal at least at the first or second sensor; and
    determining a plurality of possible relative positions of the objects relative to the device of varying location for each sensor based on the propagation times.

2. The method as claimed in claim 1, further comprising the steps of:
    determining potential positions of the object determined by at least two propagation time measurements based on ignored measured data.

3. The method as claimed in claim 2, further comprising a step of monitoring positions determined in three evaluation steps with regard to a frequency of occurrence, and determining the distance only for the position whose frequency exceeds a prescribed limit value.

4. The method as claimed in claim 2, further comprising a step of determining the distance between the object and the device of varying location only when the object is located in a sensor corridor which is between the first and the second sensors.

5. The method as claimed in claim 4, wherein the first and second sensors are two sensors among a plurality of sensors on the device and the sensor corridor is defined between sensors executing the current measurements.

6. The method as claimed in claim 5, wherein an object with a minimum distance is identified in the case of measurement of a plurality of objects with different distances from the device of varying location.

7. A method for determining the distance between an object and a device of varying location comprising the steps of:
    transmitting first and second signals from corresponding first and second locations on the device;
    receiving the first signal reflected from an object with a first sensor and a second sensor;
    receiving the second signal reflected from an object with the first sensor and the second sensor;
    determining propagation times between the transmission of the first signal and the reception of the first signal for each sensor;
    determining at least one propagation time between transmission of the second signal and the reception of the second signal at least at the first or second sensor; and
    determining a plurality of possible relative positions for objects relative to the device of varying location for each sensor based on the propagation times.

8. A system for determining the distance between an object and a device of varying location comprising:
    means for transmitting first and second signals from corresponding first and second locations on the device;
    means for receiving the first signal reflected from an object with a first sensor and a second sensor;
    means for receiving the second signal reflected from an object with the first sensor and the second sensor;
    means for determining propagation times between the transmission of the first signal and the reception of the first signal for each sensor;
    means for determining at least one propagation time between transmission of the second signal and the reception of the second signal at least at the first or second sensor; and
    means for determining a plurality of possible relative positions for objects relative to the device of varying location for each sensor based on the propagation times.

* * * * *